Sept. 28, 1971   P. WALTON   3,608,432
SERVOMECHANISMS INCLUDING ELECTRICAL STEPPER MOTORS
Filed Feb. 14, 1969   4 Sheets-Sheet 1
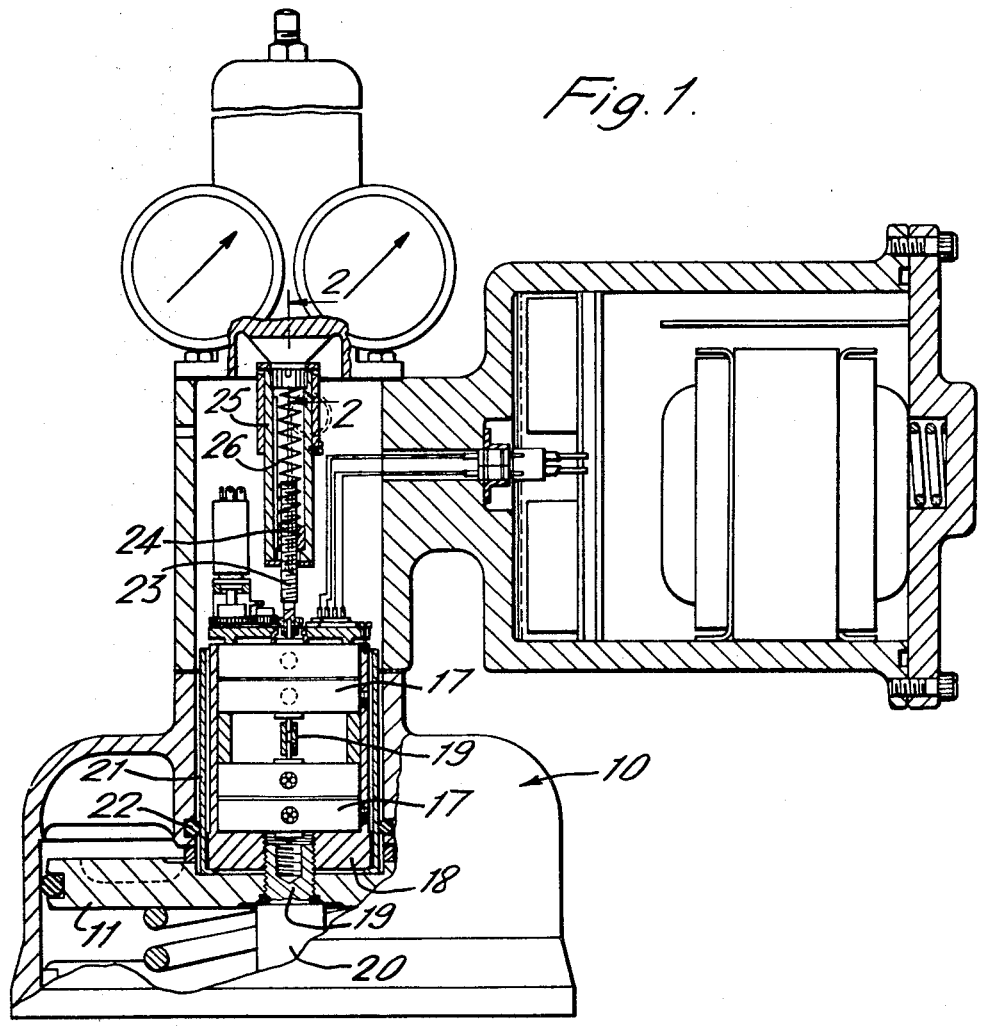
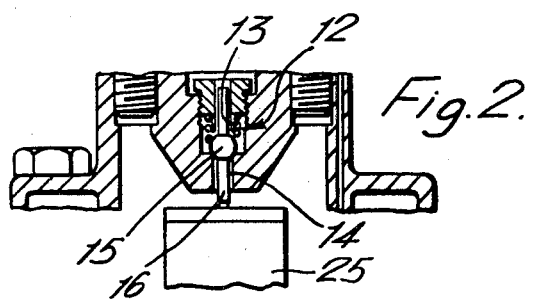
INVENTOR
PETER WALTON
BY Holman, Glascock,
Downing & Seebold
ATTORNEYS

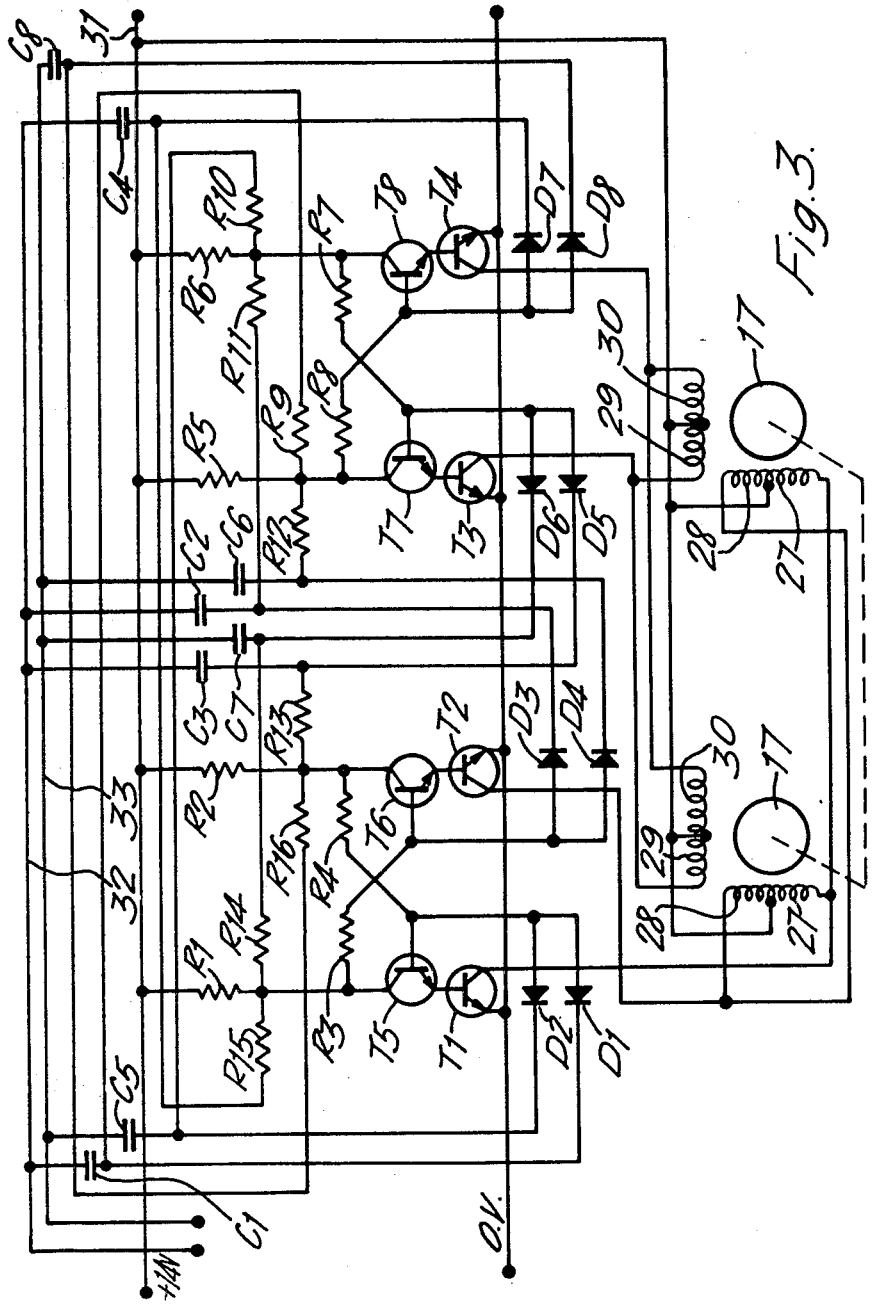

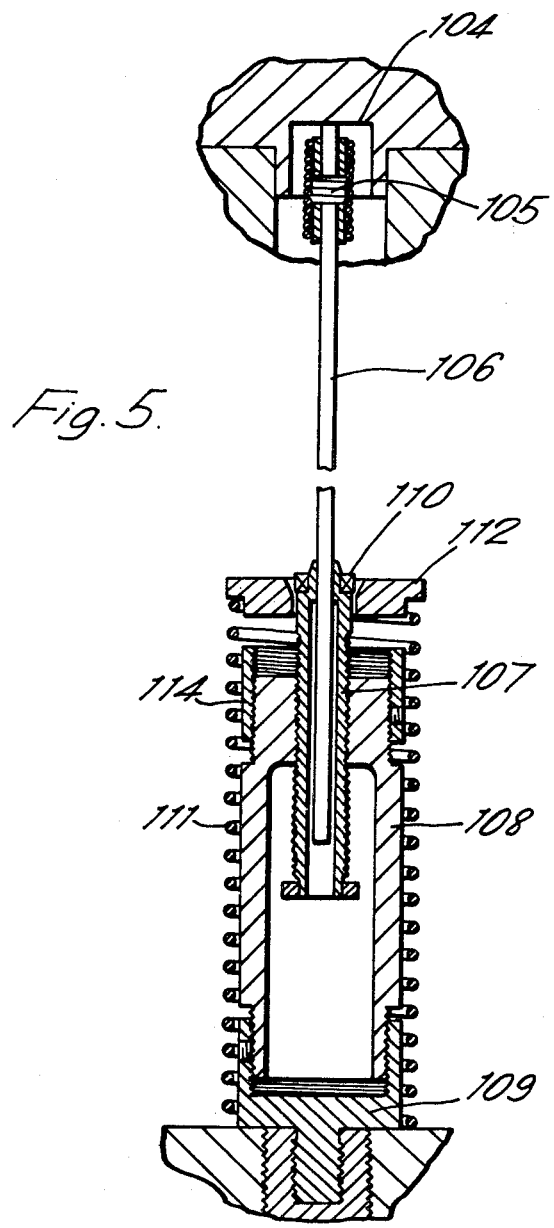

United States Patent Office 3,608,432
Patented Sept. 28, 1971

3,608,432
SERVOMECHANISMS INCLUDING ELECTRICAL STEPPER MOTORS
Peter Walton, Gloucester, England, assignor to Serck Industries Limited, Birmingham, England
Filed Feb. 14, 1969, Ser. No. 799,883
Claims priority, application Great Britain, Feb. 14, 1968, 7,186/68
Int. Cl. F15b 9/10, 15/17
U.S. Cl. 91—380                      7 Claims

ABSTRACT OF THE DISCLOSURE

A servomechanism in which a feed back connection is provided between an output member and a control member. The feed back connection has a first part on the output member and a second part adapted to be displaced relative to the first part by a stepper motor unit and coupled to the control member by a coupling permitting continuing movement of the second part when the control member is at one end of its travel.

BACKGROUND OF THE INVENTION

This invention relates to servomechanisms including electrical stepper motors, i.e. motors of the type incorporating a plurality of fixed coils which are sequentially energized, in use, to turn a magnetized rotor through a succession of angular steps.

SUMMARY OF THE INVENTION

A servomechanism in accordance with the invention comprises the combination of a power operated device having a movable output member, a power control device controlling the supply of power to said power operated device and including a movable control member displaceable within a limited range of movement, and feed back means operably interconnecting the output member and the control member for feed back, said feed back means comprising a first part co-acting with the output member, a second part co-acting with the control member, first coupling means operably coupling said output member to said first part, second coupling means operably coupling said control member to said second part, an electrical stepper motor drivingly connected to one of said parts and acting on energization to displace said first and second parts relative to one another, one of said coupling means permitting movement between the associated part and the associated member when said control member is at one end of its limited range of movement, whereby the one of said parts which is driven by the motor can continue to be driven thereby when the control member is at said one end of its limited range of movement and the other part is moving at a rate determined by the rate of movement of the output member, being a rate less than the rate of movement of the part driven by the motor.

In the accompanying drawings:

BRIEF DESCRIPTION OF THE DRAWINGS

FIG. 1 is a section through one example of an electro-pneumatic servomechanism in accordance with the invention;

FIG. 2 is a fragmentary section on line 2—2 in FIG. 1;

FIG. 3 is an electrical circuit diagram of the control system for the servomechanism;

FIG. 5 is an enlarged fragmetary view of a part of the mechanism shown in FIG. 4.

DETAILED DESCRIPTION OF THE INVENTION

Figure 4:
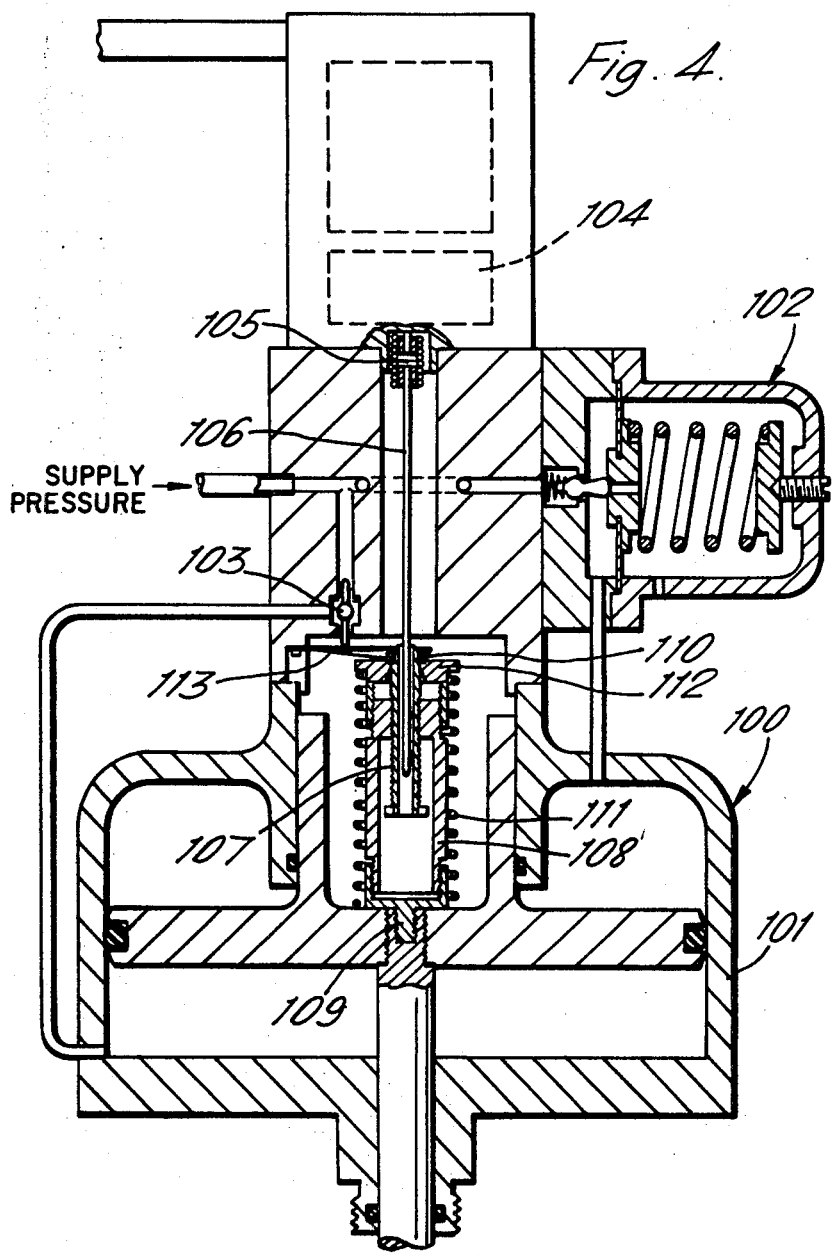
FIG. 4 is a section through another example of an electro-pneumatic servomechanism in accordance with the invention.

Referring firstly to FIGS. 1 and 2 the servomechanism incorporates a pneumatic piston and cylinder unit 10 in which a piston 11 forms the output member of the servomechanism. Mounted on the cylinder of the unit 10 is a positioning control therefor incorporating a peumatic regulator which supplies one end of the cylinder, in the present case the upper end, with a constant supply of air at a pressure below the main supply pressure.

The supply of air to the underside of the piston is controlled by a pilot valve 12 as shown in FIG. 2, constituting a power supply control device which controls movement of the piston 11. This valve 12 includes a pair of oppositely disposed ports 13, 14 connected respectively to the main supply pressure and to the atmosphere. A movable control member in the form of a ball 15 is lightly spring loaded to close the port 14 from which a stem 16 on the ball 15 projects. The pilot valve has a further port (not shown) connected to the cylinder 10 beneath the piston 11. The pressure at this further port is determined by the instantaneous position of the ball 15. If the ball 15 is at a mid-position, the pressure in the lower end of the cylinder will exactly counterbalance the downward force applied to the piston by the constant loading pressure so that the piston will be stationary. Movement of the ball 15 under the influence of its spring loading to close port 14 will cause the full main pressure to be applied to the piston 11, causing upward movement thereof, and displacement of the ball against port 13 will exhaust the lower end of the cylinder for downward movement of the piston.

For providing a feedback from the piston 11 to the ball 15 there is provided a stepper motor unit comprising two interconnected stepper motors 17 in a cup-shaped housing part 18. The motors 17 are co-axial and have their shafts connected together by a coupling sleeve 19. The housing part 18 is secured directly to the piston 11 by means of a first coupling means constituted by a screw-threaded spigot 19 on piston rod 20 of the piston, and the spigot co-acts with a screw-threaded bore in the housing part 18. The housing 18 also clamps a tube 21 to the piston, and the tube 21 slides in a sealing ring 22 in the end of the cylinder. The housing part 18 of the motor unit is contained substantially completely in the tube 21.

The motor unit drives a screw 23 with which a control part in the form of a nut 24 is engaged. The nut 24 is coupled to the ball 15 by means of a second coupling means constituted by a sleeve member 25, which is mounted for rectilinear movement and which can abut the stem 16, and a light spring 26 acting between the nut 24 and the member 25 serves to urge the member 25 upwardly as viewed in FIG. 1 and the nut 24 downwardly. The spring 26 is pre-stressed so as to require a force to compress it greater than the force required to overcome the spring loading of the ball 15. Thus, the second coupling means will transmit to the ball any upward movement of the nut 24 until the ball closes the port 13. Further movement of the nut 24 is then permitted by compression of the spring 26. On downward movement of the nut 24, the sleeve member 25 becomes disengaged from the stem 16.

The arrangement is therefore such that, in use, when the motors 17 are operated to drive the nut 24 upwardly, the ball 15 will close the port 13 so that the lower end of the cylinder 10 will be exhausted, thereby causing downward movement of the piston 11. The combination of the motors 17, the screw 23 and the nut 24 will thereby be lowered until the nut re-engages the shoulder in the member 25 towards which it is urged by the spring 26. Thereafter, continuing downward movement of the nut 24 will be accompanied by movement of the ball 15 until the piston 11 is brought to rest at a new position corresponding to the new rest position of the nut 24.

The electrical circuit shown in FIG. 3 controls the supply of pulses to the motors 17. As shown, each motor 17 has four coils 27, 28, 29 and 30. The coils 27 and 29 are connected so as when energized to produce south poles acting on the magnetized rotor and the coils 28 and 30 are connected to produce north poles. To produce a clockwise rotation the coils have to be energized in the following sequence: 27 with 29, 27 with 30, 28 with 30, 28 with 29, 27 with 29, and so on. To produce counter clockwise rotation, the coils are energized in the following sequence: 27 with 29, 28 with 29, 28 with 30, 27 with 30, 27 with 29 and so on. The rotor of the motor has twelve pairs of poles and the two sets of coils are set apart at an angle of 90° so that a single step turns the rotor through 7½°. The rotor is held magnetically at each new position by maintaining the energization of the last energized two coils until the next pulse is delivered to step the rotor.

The common points of coils 27 and 28 and of coils 29 and 30 are connected together and to a line 31 held at a positive potential. The other ends of the two coils 27 are grounded through the emitter-collector circuit of an n-p-n transistor $T_1$. The coils 28, 29 and 30 are similarly associated with n-p-n transistors $T_2$, $T_3$ and $T_4$ respectively.

The transistors $T_1$ to $T_4$ are controlled respectively by four transistors $T_5$ to $T_8$ arranged in two cross-connected bistable circuits. The transistors $T_5$ and $T_6$, which have their emitters connected to the bases of transistors $T_1$ and $T_2$ respectively, together with resistors $R_1$ and $R_2$ connecting their respective collectors to the line 31, and feedback resistors $R_3$ and $R_4$ cross-connecting the bases and collectors of the transistors form one bistable circuit. The other bistable circuit is constituted by the transistors $T_7$ and $T_8$, and resistors $R_5$ to $R_8$. Inputs to the bistable circuits are made via diodes $D_1$ and $D_8$, with the odd diodes having the cathodes connected via capacitors $C_1$, $C_2$, $C_3$ and $C_4$ to a line 32 and the even diodes having their cathodes connected via capacitors $C_5$, $C_6$, $C_7$ and $C_8$ to a line 33. The anodes of diodes $D_1$ and $D_2$ are connected to the base of transistor $T_5$ and diodes $D_3$, $D_5$ and $D_6$ and $D_7$ and $D_8$ are similarly connected to transistors $T_6$, $T_7$ and $T_8$ respectively.

The cross connections between the two bistable circuits are made by eight resistors $R_9$ to $R_{16}$. $R_9$ connects the collector of transistor $T_7$ to the cathode of diode $D_1$ and $R_{10}$ to $R_{16}$ similarly interconnect $T_8$ and $D_2$, $T_8$ and $D_3$, $T_7$ and $D_4$, $T_6$ and $D_5$, $T_5$ and $D_6$, $T_5$ and $D_7$, and $T_6$ and $D_8$. The circuit is such that a transistor $T_5$ to $T_8$ which is conductive will only become non-conductive when a pulse is applied to one of the lines 32, 33, if the associated one of the diodes which is connected to the line 32 or 33 to which the pulse is applied is biased, as a result of the cross-connections between the two bistable circuits, to conduct. Thus, for example, a condition exists such that transistors $T_5$ and $T_7$ are conductive, the diode $D_1$ will be conducting, being in a series circuit with the resistors $R_4$ and $R_9$. The diode $D_5$ on the other hand, will not be conducting since the two ends of its series circuit (i.e. through resistors $R_7$ and $R_{13}$) will both be at the same potential. When a pulse is received at line 32, therefore, capacitor $C_1$ will be able to charge up negatively through diode $D_1$, thereby switching off the transistor $T_5$. Capacitor $C_3$ cannot, however, charge up so that the state of transistor $T_7$ is unaltered. Thus, there is a change from a condition in which coils 27 and 29 are energized to a condition in which coils 28 and 29 are energized, thus producing a clockwise step. Similarly a pulse on line 33 produces a counter-clockwise step.

The two pulse lines 32 and 33 may receive pulses from any convenient source, it being borne in mind that the number of pulses received will determine the distance through which the rotor is turned and the choice of the pulse line will determine the direction of rotation.

The requirement of a relatively high torque at a frequency above that normally employed for stepper motors also led to the use of a pair of motors. A motor which can produce half of the required torque at the appropriate relatively high frequency cannot be scaled up to produce the required torque at that frequency. The increased size of the electromagnetic components introduces longer flux build-up periods so that the required flux may not be built up during the relatively short pulse. It has been found that the use of separate small motors connected together mechanically to drive a common shaft and electrically connected together in parallel enables the required torque/frequency characteristics to be obtained.

Turning now to FIGS. 4 and 5, the alternative construction shown includes a piston and cylinder unit 100 which, as in the example, shown in FIGS. 1 and 2 has a regulator 102 of a known type such as that disclosed in U.S. Pat. No. 2,518,852, whereby a constant pressure below the supply main pressure is applied to the upper end of the cylinder above the piston.

A pilot valve 103 identical to that shown in FIG. 2 controls the supply of air to the underside of the piston.

An electrical stepper motor 104 encapsulated with its associated control circuits is mounted on the casing of the servomechanism. The motor shaft is connected via a spring coupling 105 to a shaft 106 of non-circular cross-section. This shaft 106, which is conveniently of rectangular section, extends into a hollow screw member 107 relative to which it is axially slidable. The screw member 107 is, however, not rotatable relative to the shaft 106.

The screw member 107 is screw-threadedly engaged with a body 108 which is adjustably secured to the piston of unit 100 by means of a coupling member 109. The screw member 107 and the body 108 form, in combination, a feedback connection between the piston and the valve 103 and means are provided for operably coupling the screw member 107 to the valve 103. To this end, there is an abutment ring 110 mounted on the screw member 107. A spring 111 surrounding the body 108 is compressed between the piston and an annular member 112 slidable on the screw member 107, and the member 112 is urged by the spring towards the abutment ring 110. Mounted on the casing of the servomechanism is a leaf spring 113 the free end of which is bifurcated and is engageable with the annular member 112. The spring 113 serves to actuate the valve 103.

In use, when the mechanism is in equilibrium, the position of the valve 103 is such that the pressure on the underside of the piston balances the constant pressure on the upper side. If the motor 104 is being driven in a counterclockwise direction, this results in an upward movement of the screw member 107 as viewed in the drawings, thereby causing actuation of valve 103 to open the lower end of the cylinder to exhaust. The piston therefore moves downwardly carrying the body 108 with it. If the piston does not move downwardly as quickly as the screw member 107 is driven upwardly by the motor 104 so that the valve 103 is thrust upwardly into contact with its upper seat, movement of the member 112 is arrested. The screw member can, however, continue its upward journey until its new position is reached. The spring 111 supplies sufficient force to hold valve 103 shut. After the upward movement of the screw member has been arrested, the piston will continue to move downwardly until the abutment ring 110 reaches the annular member 112. The annular member 112 is then moved downwardly sufficiently to return the piston to balance.

On clockwise rotation of the motor shaft, the screw member moves downwardly, moving the member 112 out of contact with the spring 113 thereby causing the valve 103 to admit high pressure fluid to the underside of the piston. The piston is thus moved upwardly until equilibrium is restored.

The body 108 has a stop sleeve 114 adjustably attached thereto and the sleeve 114 acts to limit movement of member 112 towards the piston. If it is attempted to drive the screw member downwardly beyond he position determined by the sleeve 114 the motor will stall.

Although the invention has been described and illustrated in detail, it is understood that this does not limit the invention. The spirit and scope of this invention is limited only by the language of the appended claims.

Having thus described my invention what I claim as new and desire to secure by Letters Patent is:

1. A servomechanism comprising, the combination of, a power operated device, a movable output member for the power operated device, a power control device controlling the supply of power to said power operated device and including a movable control member displaceable within a limited range of movement, and feedback means operably interconnecting the output member and the control member for feedback, said feedback means comprising a first part co-acting with the output member, a second part co-acting with the control member, first coupling means operably coupling said output member to said first part, second coupling means operably coupling said control member to said second part, an electrical stepper motor drivingly connected to one of said parts by a shaft of non-circular section non-rotatably but slidably engaged with the said one part and acting on energization to displace said first and second parts relative to one another, and one of said coupling means permitting movement between the associated part and the associated member when said control member is at one end of its limited range of movement, whereby the one of said parts which is driven by the motor can continue to be driven thereby when the control member is at said one end of its limited range of movement and the other part is moving at a rate determined by the rate of movement of the output member, being a rate less than the rate of movement of the part driven by the motor.

2. The servomechanism as claimed in claim 1 in which the first part of the feedback means comprises a body secured to the output member, and the second part comprises a screw with which the non-circular shaft is engaged and which screw-threadedly engages said first part.

3. The servomechanism as claimed in claim 2 in which the second coupling means comprises an annular member slidable on the screw and a spring urging said annular member against an abutment on the screw, with said annular member co-acting with the control element.

4. The servomechanism as claimed in claim 3 in which there is a stop on the body for limiting movement of the annular member relative thereto.

5. The servomechanism as claimed in claim 1 in which the power operated device is a fluid pressure operated piston and cylinder unit and the power control device is a valve.

6. The servomechanism as claimed in claim 5 in which a regulator is provided for regulating the pressure applied to one side of the piston of the piston and cylinder unit, with the valve controlling the pressure applied to the opposite side of the piston, 7. A servomechanism as claimed in claim 6 in which a control member of said valve controls the flow of fluid to the cylinder from a pressure fluid supply and from the cylinders to exhaust.

References Cited
UNITED STATES PATENTS

| | | | |
|---|---|---|---|
| 2,994,304 | 8/1961 | Shultz | 91—380 |
| 3,306,170 | 2/1967 | Kreuter | 91—380 |
| 3,310,284 | 3/1967 | Inosa et al. | 91—380 |
| 3,457,836 | 7/1969 | Henderson | 91—380 |

PAUL E. MASLOUSKY, Primary Examiner

U.S. Cl. X.R.

91—417, 459